No. 643,386. Patented Feb. 13, 1900.
R. SMITH.
LEAF GATHERER.
(Application filed Aug. 26, 1899.)
(No Model.) 2 Sheets—Sheet 1.
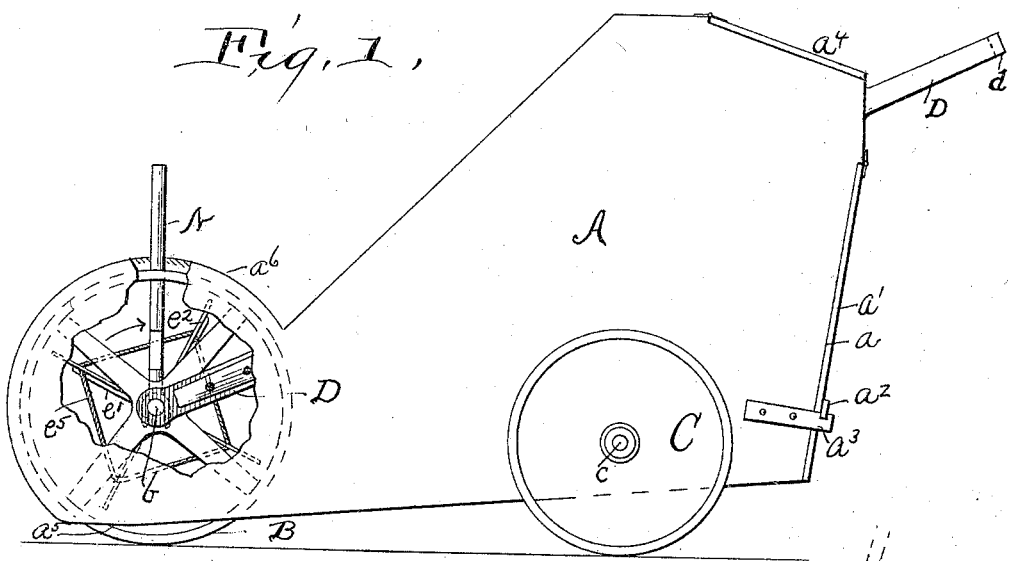
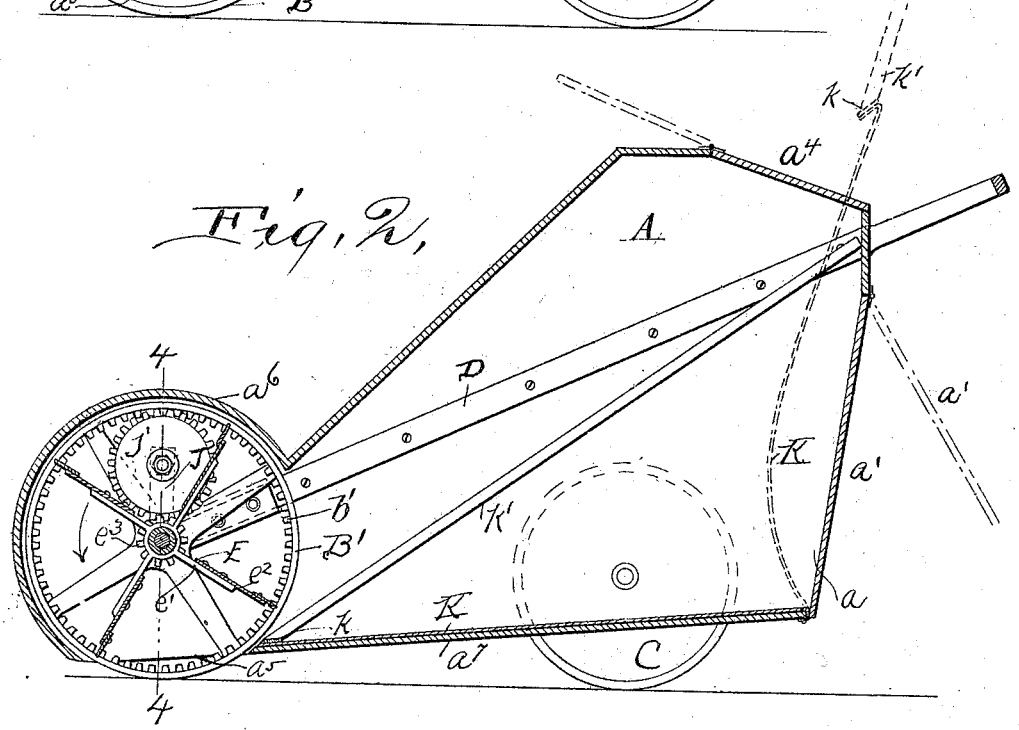
Witnesses.
E. B. Gilchrist
H. M. Wise
Inventor:
Rose Smith,
By her Attorneys,
Thurston & Bates.

No. 643,386. Patented Feb. 13, 1900.
R. SMITH.
LEAF GATHERER.
(Application filed Aug. 26, 1899.)
(No Model.) 2 Sheets—Sheet 2.

Witnesses.
E. B. Gilchrist
H. W. Wise

Inventor
Rose Smith,
By her Attorneys,
Thurston & Bates.

UNITED STATES PATENT OFFICE.

ROSE SMITH, OF CLEVELAND, OHIO.

LEAF-GATHERER.

SPECIFICATION forming part of Letters Patent No. 643,386, dated February 13, 1900.

Application filed August 26, 1899. Serial No. 728,554. (No model.)

*To all whom it may concern:*

Be it known that I, ROSE SMITH, a citizen of the United States, residing at Cleveland, in the county of Cuyahoga and State of Ohio, have invented a certain new and useful Improvement in Leaf-Gatherers, of which the following is a full, clear, and exact description, reference being had to the accompanying drawings.

The invention relates to a machine which when rolled upon the ground, and especially over a grass lawn, will gather up the dry leaves and other analogous things thereon.

The object of the invention is to provide a cheap and simple machine of this character and one which may be quickly and conveniently unloaded whenever desired.

To that end the invention consists in the construction and combination of parts hereinafter described, and pointed out definitely in the claims.

Figure 3:
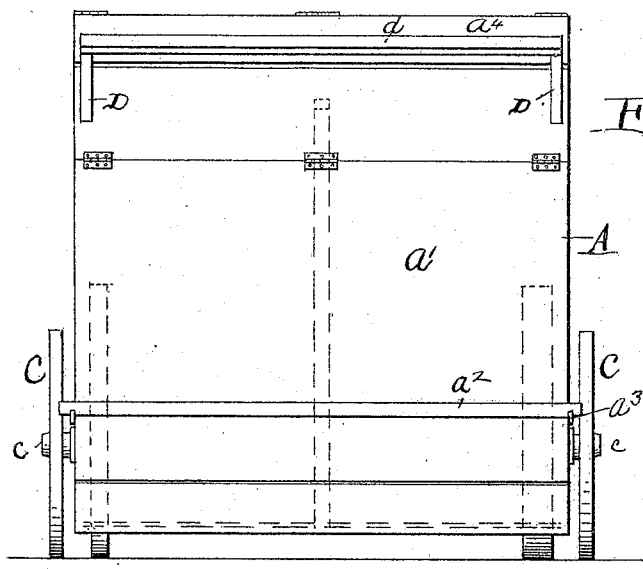
Figure 4:
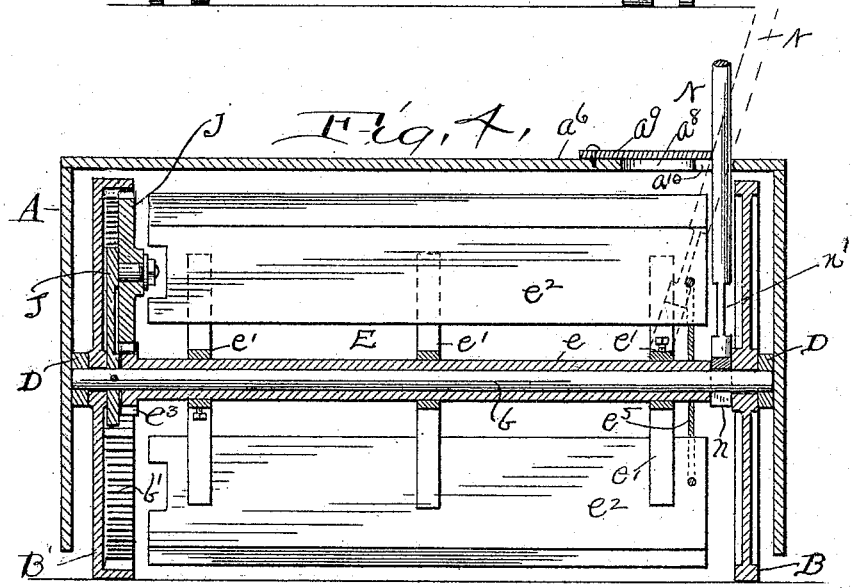

In the drawings, Figure 1 is a side elevation of the machine. Fig. 2 is a longitudinal sectional view thereof. Fig. 3 is a rear elevation, and Fig. 4 is a central vertical enlarged section on line 4 4 of Fig. 2.

Referring to the parts by letters, A represents a box or receptacle for the leaves, &c. Its rear end has an opening $a$, which extends from the bottom upward a considerable distance, which opening is closed by a door $a'$, hinged at its upper end. This door may be held closed by any suitable latching contrivance—as, for example, the bar-latch $a^2$ shown in the drawings, which engages with the keeper-plates $a^3$, which are attached to the sides of the machine and project rearward therefrom. In the top of the box, near its rear end, there is another opening, which is closed by a door $a^4$. The rear end of this box is supported above the ground by two wheels C C, which are mounted on short axles $c$, projecting laterally from the sides of the box.

The front end of the box is supported by two wheels B B', which are loosely mounted on the axle $b$ inside of the box and close to its sides. This axle extends transversely across the box, and its ends are made fast to the bars D D, which are fastened to the inner sides of the box and extend out behind it, the cross-bar handle $d$ being fastened to the rear ends of said bars.

On the front axle $b$ a long sleeve $e$ is rotatably mounted. To this sleeve the arms $e'$ are attached, and to these arms, near their outer ends, the transverse blades $e^2$ are attached, the structure composing said parts constituting a revoluble fan E. The blades $e^2$ are so placed that as the fan revolves they do not touch the ground, although their outer edges pass through a transverse opening $a^5$ in the bottom of the box, and they come within an inch, more or less, of the ground. The device is therefore not a sweeper which brushes the leaves off the ground and into the box. The revolution of the fan creates air-currents, which lift the leaves from the ground and carry them into the box. The fan is rotated through the train of gears shown—that is to say, the pinion $e^3$ on the sleeve, the internal gear $b'$ on one of the wheels, and an intermediate gear $j$, which meshes with the pinion $e^3$ and gear $b'$ and which is loosely mounted on an arm J, which is rigidly fastened to the axle $b$.

The fan and the described operating mechanism are substantially covered by a cylindrical hood $a^6$, which is a part of the box. As before stated, there is an opening $a^5$ in the bottom of the box below the fan and between the lower edge of the hood and the front edge of the bottom $a^7$ of the box.

From the foregoing description it is apparent that when the machine is moved forward the fan rotates in the direction of the arrow in Fig. 1, and when the machine is rolled backward the fan rotates in the reverse direction, as shown by the arrow in Fig. 2, the direction of rotation of the fan being always opposite to that of the wheels. The machine works equally well whether rolled backward or forward—that is to say, the air-current generated by the fan lifts the leaves from the ground and blows them back into the box.

In order to facilitate the emptying of the box, a flexible apron K, made of canvas or other analogous stuff, rests upon the bottom of the box. Its rear end is fastened to the box, and its front end is fastened to a cross-bar $k$. A brace-bar $k'$ is made fast to the middle of the bar $k$ and is of such length that its rear end engages with the rear end of the box and acts as a brace to keep the apron straightened out. In order to empty the load, the doors $a'$ and $a^4$ are opened, and the operator reaches in and, taking hold of the brace-bar $k'$, draws it up and out of the opening covered by the door $a^4$. The result is that the leaves are discharged out through the opening $a$, as indicated by dotted lines in Fig. 2.

It is generally desirable to empty the machine at some point remote from that where the leaves are gathered, and consequently it is desirable that the fan shall not rotate in passing from one of these points to the other. With that end in view the sleeve is longitudinally movable on the axle $b$ to permit the withdrawal of the pinion $e^3$ from engagement with the gear $j$. A shifting-lever N is provided for moving this sleeve. It passes through a hole in the hood and has on its lower end a fork $n$, which is adapted to embrace and rest upon the axle or the sleeve, as the case may be. It is of such width that when the sleeve has been moved endwise to cause the engagement of the gear $b'$ and pinion $j$ this fork fits in the space between the wheel B' and the end of the sleeve, and while it rests upon the axle it prevents the endwise movement of the sleeve.

When it is desired to disengage the fan from its operating machinery, this lever is raised and its end moved over one of the wires $e^5$, which are stretched between the arms of the fan-frame. By then moving the lever it draws the sleeve endwise and causes the disengagement of the pinion $e^3$ and gear $j$. The machine may therefore be rolled along the ground without causing the rotation of the fan.

Having described my invention, I claim—

1. In a leaf-gatherer, the combination of a box having its rear end mounted on wheels, an axle extending across the box near its front end over an opening in the bottom of the box, said axle being made fast to the sides of the box, wheels loosely mounted on said axle, one of said wheels having an internal gear, a sleeve loosely mounted on said axle, a pinion secured to the sleeve, an arm fast to the axle, a gear mounted thereon and adapted to engage with the internal gear and pinion referred to, arms secured to said sleeve, and fan-blades extending crosswise of the machine and secured to said arms, substantially as and for the purpose specified.

2. In a leaf-gatherer, the combination of a box having its rear end mounted on wheels, an axle extending across the box near its front end over an opening in the bottom of the box, said axle being made fast to the sides of the box, wheels loosely mounted on said axle one of said wheels having an internal gear, a longitudinally-movable sleeve rotatably mounted on the axle, a pinion secured to the sleeve, an arm fast to the axle, a gear mounted thereon and engaging with the internal gear referred to, means for moving said sleeve endwise to cause the pinion thereon to engage with said gear, arms secured to the sleeve, and fan-blades extending crosswise of the machine secured to said arms, substantially as and for the purpose specified.

3. In a leaf-gatherer, the combination of a box having its rear end mounted on wheels, an axle extending across the box near its front end over an opening in the bottom of the box, said axle being made fast to the sides of the box, wheels loosely mounted on said axle, one of said wheels having an internal gear, a longitudinally-movable sleeve rotatably mounted on the axle, a pinion secured to the sleeve, an arm fast to the axle, a gear mounted thereon and engaging with the internal gear referred to, arms secured to the sleeve, and fan-blades extending crosswise of the machine secured to said arms, a lever having a fork-shaped end adapted to embrace and rest upon the axle between the end of the sleeve and the adjacent wheel, and wires extending between the fan-arms with which said lever may engage, substantially as and for the purpose specified.

4. In a leaf-gatherer, the combination of the box mounted on wheels and having an opening in its rear end, a door for closing said opening, an apron adapted to cover the bottom of the box and secured at its rear end to the box, means for holding the apron in an extended condition, means for lifting the front end of the apron and drawing it upward and rearward, a transverse fan mounted in the front end of the box over an opening in the bottom thereof, and mechanism connecting said fan with one of the wheels, substantially as and for the purpose specified.

5. In a leaf-gatherer, the combination of the box mounted on wheels and having an opening in its rear end, a door for closing said opening, an apron covering the bottom of the box and secured at its rear end to the box, a cross-bar secured to the front end of said apron, a brace-bar secured to the cross-bar, the box having an opening in its top through which the brace-bar may be drawn, a transverse fan mounted on the front end of the box over an opening in the bottom thereof, mechanism connecting said fan with one of the wheels, substantially as and for the purpose specified.

In testimony whereof I hereunto affix my signature in the presence of two witnesses.

ROSE SMITH.

Witnesses:
E. L. THURSTON,
ALBERT H. BATES.